Feb. 17, 1942.                J. E. BATIE                2,273,615
                      METHOD OF FORMING BRAKE DRUMS
                          Filed Nov. 4, 1940

INVENTOR.
JOSEPH E. BATIE
BY
ATTORNEYS

Patented Feb. 17, 1942

2,273,615

UNITED STATES PATENT OFFICE 2,273,615

METHOD OF FORMING BRAKE DRUMS

Joseph E. Batie, Detroit, Mich., assignor to Kelsey-Hayes Wheel Company, Detroit, Mich., a corporation of Delaware Application November 4, 1940, Serial No. 364,308

9 Claims. (Cl. 22—204)

The invention relates to the manufacture of brake drums and refers more particularly to the manufacture of composite brake drums having lined shells.

The invention has for an object to provide an improved method of forming brake drums which will produce a relatively light weight composite brake drum with sufficient strength to readily withstand the stresses to which it is subjected and having an efficient long lifed brake engaging surface.

The invention has for another object to provide an improved method by means of which a plurality of brake drums are formed during the carrying out of the method.

The invention has for further objects to provide an improved method by means of which the completed brake drum will have an annular sealing groove in its free edge; and to provide an improved manner of heating the brake flanges of the brake drum shells to assure fusing or molecular bonding of the brake engaging material to the shells.

These and other objects of the invention will become apparent from the following description, taken in connection with the accompanying drawing, in which Figure 1 is a central section through a brake drum shell used in my method;

Figure 1:
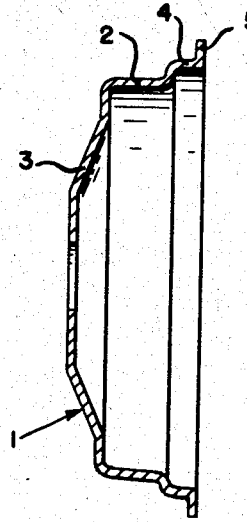

In carrying out my method of forming brake drums, I start with the sheet metal brake drum shell 1, as illustrated in Figure 1. This shell is preferably formed from a flat sheet steel blank by suitable drawing operations and comprises the annular brake flange 2 and the integral web 3. The brake flange at its free edge is formed with the enlarged portion 4 terminating in the radial flange 5.

Figure 2:
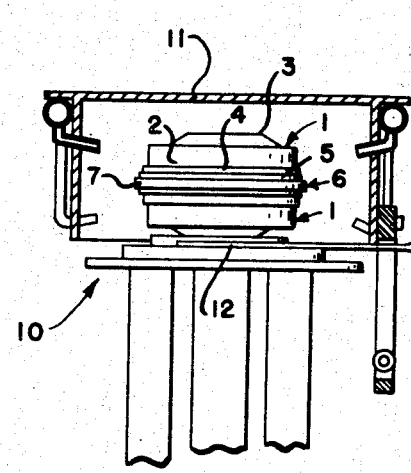
Figures 2 and 3 are diagrammatic sectional views illustrating various steps in my method.

In carrying out my method, the brake drum shells and, more particularly, the inner surfaces of their brake flanges are coated with a suitable flux as by passing the shells through a flux bath. The insert 6 is then placed between the brake flanges of two of the flux coated shells 1 having their axes in substantial alignment and their brake flanges extending toward or facing each other. This assembly is preferably carried out with the axes substantially perpendicular. The insert is an annulus having its body formed preferably of cast iron and its surface formed of a suitable refractory material. The insert has the outer radial portion 7 which is located between the radial flanges 5 of the shells, the oppositely extending axial portions 8 which are preferably tapered toward their free edges and which are adapted to closely fit within the enlarged portions 4 of the shells, and the inner radial portion 9 which is preferably of less width than the outer radial portion. The assembly comprising the annular insert resting on the free edge of the lower shell and the upper shell resting on the insert is heated to a temperature in the neighborhood of 1300° F. and this heating is accomplished, as shown, by positioning the assembly substantially vertically within the furnace 10 having, in the present instance, the hood 11 which is adapted to be lowered to enclose the assembly and raised to clear the assembly. The assembly while being transferred to and from the furnace is supported by means engaging the lower face of the radial flange 5 of the lower shell and this means is preferably a yoke 12 carried upon the rod 13. The rod is longitudinally moved to carry the assembly into the central zone of the furnace, after which the rod is lowered during the lowering of the hood 11 to clear the assembly during the heating. After the heating, the hood 11 is raised, as is also the rod and then the rod is longitudinally moved to carry the assembly beyond the furnace. Figure 2 diagrammatically illustrates this apparatus.

Figure 4:
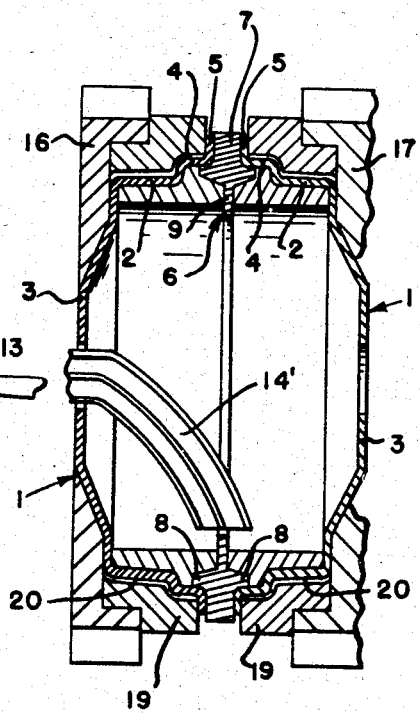
Figure 4 is a central section through the brake drum and insert assembly as formed at the end of the step illustrated in Figure 3.
Figure 3:
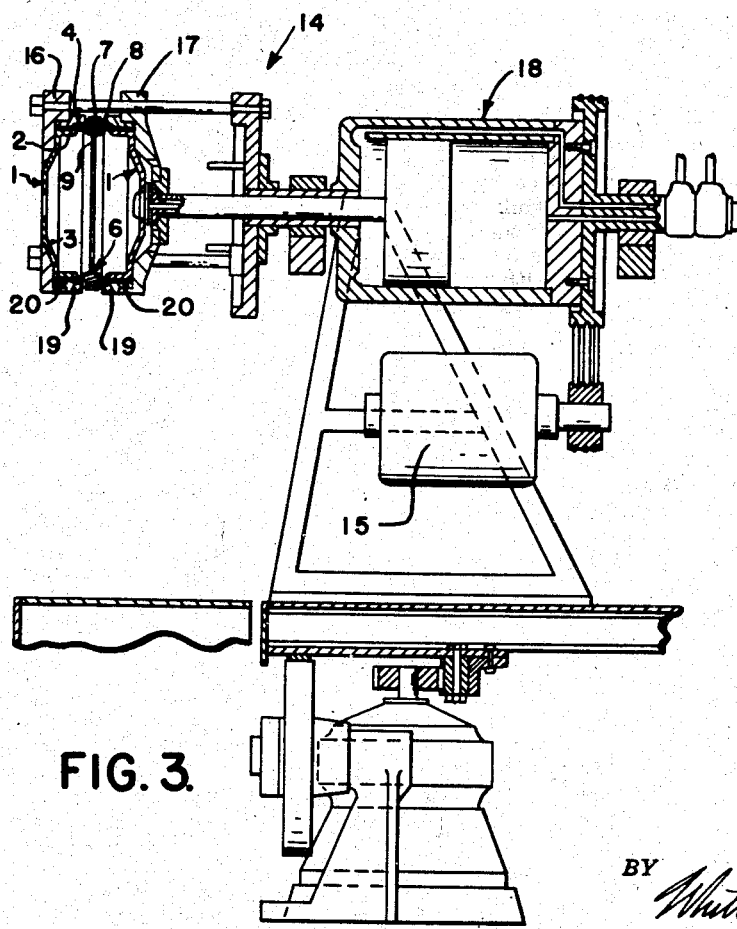

After the heating of the assembly, it is positioned in the rotatable work holder 14, illustrated in Figures 3 and 4. The holder is driven by the electric motor 15 and comprises the relatively movable axially aligned sections 16 and 17, the latter, as shown, being movable axially toward and away from the former by suitable means, such as the air cylinder 18. The holder has the radial portion 19 for abutting a radial flange 5 of the adjacent shell. The holder also preferably has the annular series of angularly spaced lands 20 for engaging the outer face of the brake flange of the adjacent shell. It will thus be seen that the sections serve to clamp the shells and especially their radial flanges tightly against the annular insert and, more particularly, its outer radial portion, at which time the axial portions of the annular insert tightly engage the free edge portions of the inner surfaces of the enlarged portions 4. Also, that the sections serve to position the shells in axial alignment and true their brake flanges. With the sections in clamping position and their axes substantially horizontal, the electric motor is started and when the desired speed of rotation has been reached fluid brake engaging material, which is preferably molten iron, is poured simultaneously against the inner surfaces of the brake flanges and the annular insert, the temperature of the molten iron being such that it fuses to or molecularly bonds with the steel of the shells. This temperature is in the neighborhood of 2900° F. The molten iron is directed into the shells by the pouring spout 14' which is insertable through the central hub opening of one of the shells. The pouring spout is constructed with two passageways or channels for simultaneously pouring molten iron against the brake flanges of both shells. After the pouring has been completed, rotation is continued until the molten iron has cooled and sufficiently solidified, after which the rotation is discontinued and the assembly comprising the lined shells and annular insert is removed from the holder.

Figure 5:
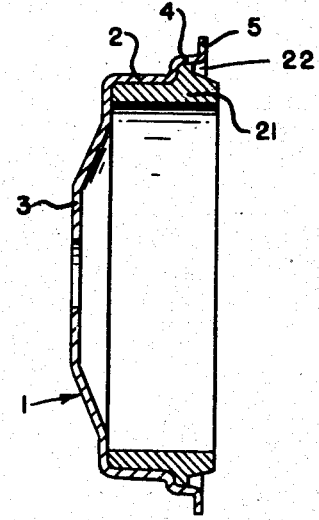
Figure 5 is a central section illustrating the completed brake drum.

After removal, the lined shells and annular insert are separated or disengaged from each other, this being easily accomplished since the cast iron has been prevented from fusing with the annular insert by reason of the refractory surface of the insert. As a result, two lined brake drums are secured of the character illustrated in Figure 5 in which the lining 21 is fused to or molecularly bonded with the brake flange 2 and also the adjacent portion of the web 3 of the shell. Furthermore, the annular sealing groove 22 is provided between the free edge portion of the enlarged portion 4 and the free edge portion of the lining 21, this groove being for use in sealing the brake drum by the backing plate after the brake drum has been assembled on a motor vehicle wheel.

From the above description, it will be readily seen that I have provided an economical method of manufacturing composite brake drums since sheet metal or, more particularly, sheet steel shells formed to be readily attached to a motor vehicle wheel may be used and since they may be readily heated and lined with brake engaging material. It will also be seen that the lined shells may be readily separated and upon separation have in their free edges the desired annular sealing grooves.

What I claim as my invention is:

1. In the method of forming brake drums, the steps of holding a pair of individual brake drum shells in substantially axially aligned relation with their brake flanges extending toward each other, directing brake engaging material simultaneously against the inner surfaces of the brake flanges during rotation of the shells and at the same time forming annular grooves by controlling the flow of the brake engaging material in the zones of the free edges of the brake flanges, and then separating the lined shells.

2. In the method of forming brake drums, the steps of holding a pair of individual brake drum shells in substantially axially aligned relation with their brake flanges extending toward each other, directing brake engaging material simultaneously against the inner surfaces of the brake flanges during rotation of the shells and meanwhile separating the material in one shell from the material in the other shell, and then separating the lined shells.

3. In the method of forming brake drums, the steps of placing an insert between the brake flanges of two individual brake drum shells, pouring brake engaging material upon the brake flanges with the insert therebetween while the shells and insert are being rotated, and then separating the insert and the shells having the brake engaging material.

4. In the method of forming brake drums, the steps of assembling two individual brake drum shells, heating the brake flanges of the shells while assembled, casting brake engaging material upon the inner faces of the brake flanges while the assembled shells are clamped together and being rotated, and then separating the shells having the cast material.

5. In the method of forming lined brake drums, the steps of placing an insert between the brake flanges of two individual sheet metal brake drum shells, heating the shells with the insert therebetween, casting brake engaging material upon the inner faces of the brake flanges while the shells are heated and the shells and insert are clamped together and being rotated, and then separating the insert and the lined shells.

6. In the method of forming lined brake drums, the steps of placing a refractory surfaced annular insert between and extending radially inwardly beyond the free edges of the brake flanges and also within the brake flanges of two individual sheet metal brake drum shells, heating the shells with the insert therebetween, casting brake engaging material against the inner faces of the brake flanges and also against the insert while the shells are heated and while the shells and insert are clamped together and being rotated, and then separating the insert and the lined shells, thereby forming lined brake drums having annular grooves at their free edges.

7. In the method of forming brake drums, the steps of placing an insert between the radial flanges at the free edges of the brake flanges of two individual brake drum shells, heating the shells with the insert therebetween, transferring the heated shells with the insert therebetween while supporting the shells and insert from one of the radial flanges, casting brake engaging material upon the brake flanges while heated and with the insert therebetween and while the shells are being rotated, and then separating the insert and the shells.

8. In the method of forming lined brake drums, the steps of placing an insert between the radial flanges at the free edges of the brake flanges of two individual brake drum shells, heating the shells with the insert therebetween while supporting the shells and insert with their axes substantially vertical, clamping the shells upon the insert and rotating the shells and insert with their axes substantially horizontal, simultaneously pouring brake engaging material upon the inner faces of the brake flanges while the shells and insert are clamped together and being rotated, and then disengaging the insert and the lined shells.

9. In the method of forming brake drums, the steps of placing an annular insert between and extending radially inwardly beyond the free edges of the brake flanges and also within the brake flanges of two individual sheet metal brake drum shells, directing brake engaging material against the exposed portions of the inner faces of the brake flanges and also against the insert while the shells and insert are together and being rotated and then separating the insert and the lined shells.

JOSEPH E. BATIE.